United States Patent
Yamashita

(10) Patent No.: US 12,271,630 B2
(45) Date of Patent: Apr. 8, 2025

(54) DATA RECORDING DEVICE AND CONTROL METHOD FOR DATA RECORDING DEVICE

(71) Applicant: Panasonic Intellectual Property Management Co., Ltd., Osaka (JP)

(72) Inventor: Hideaki Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 90 days.

(21) Appl. No.: 18/235,110

(22) Filed: Aug. 17, 2023

(65) Prior Publication Data
US 2023/0393785 A1  Dec. 7, 2023

Related U.S. Application Data

(63) Continuation of application No. PCT/JP2021/034687, filed on Sep. 22, 2021.

(30) Foreign Application Priority Data

Feb. 24, 2021  (JP) .................................. 2021-027993

(51) Int. Cl.
G06F 3/06  (2006.01)

(52) U.S. Cl.
CPC .......... G06F 3/0659 (2013.01); G06F 3/0619 (2013.01); G06F 3/0688 (2013.01)

(58) Field of Classification Search
CPC .... G06F 3/0659; G06F 3/0619; G06F 3/0688; G06F 3/0616; G06F 3/0679; G06F 12/00; G06F 12/06; Y02D 10/00
See application file for complete search history.

(56) References Cited

U.S. PATENT DOCUMENTS 10,339,983 B1 *  7/2019  Confalonieri ...... G11C 13/0033
2006/0195708 A1  8/2006  Kato et al.
(Continued)

FOREIGN PATENT DOCUMENTS

JP   2004-289307   10/2004
JP   2006-209525    8/2006
(Continued)

OTHER PUBLICATIONS

International Search Report (ISR) issued on Dec. 28, 2021 in International (PCT) Application No. PCT/JP2021/034687.

*Primary Examiner* — Khoa D Doan
(74) *Attorney, Agent, or Firm* — Wenderoth, Lind & Ponack, L.L.P.

(57) ABSTRACT

A data recording device includes: a non-volatile memory; a high-functional non-volatile memory characterized by a processing speed faster than a processing speed of the non-volatile memory; and an access controller that controls writing of data into each of the non-volatile memory and the high-functional non-volatile memory, based on an indicator related to a temperature of the non-volatile memory. The access controller (a) writes data into the non-volatile memory when the indicator satisfies a first condition, and (b) writes data into the high-functional non-volatile memory and transfers the data from the high-functional non-volatile memory to the non-volatile memory when the indicator satisfies a second condition.

6 Claims, 7 Drawing Sheets

(56) References Cited

U.S. PATENT DOCUMENTS

| | | | |
|---|---|---|---|
| 2010/0023678 A1* | 1/2010 | Nakanishi | G11C 16/102 |
| | | | 327/512 |
| 2014/0029369 A1 | 1/2014 | Yamazaki et al. | |
| 2017/0046088 A1 | 2/2017 | Jayaraman et al. | |
| 2017/0168548 A1 | 6/2017 | Werkheiser et al. | |
| 2019/0065388 A1* | 2/2019 | Christensen | G06F 3/0634 |
| 2020/0020360 A1* | 1/2020 | Kosuru | G11C 16/10 |

FOREIGN PATENT DOCUMENTS

| | | |
|---|---|---|
| JP | 2014-26388 | 2/2014 |
| JP | 2017-107557 | 6/2017 |
| JP | 2020-532792 | 11/2020 |
| WO | 2008/093606 | 8/2008 |
| WO | 2019/046037 | 3/2019 |

\* cited by examiner

DATA RECORDING DEVICE AND CONTROL METHOD FOR DATA RECORDING DEVICE

CROSS REFERENCE TO RELATED APPLICATIONS

This is a continuation application of PCT International Application No. PCT/JP2021/034687 filed on Sep. 22, 2021, designating the United States of America, which is based on and claims priority of Japanese Patent Application No. 2021-027993 filed on Feb. 24, 2021. The entire disclosures of the above-identified applications, including the specifications, drawings and claims are incorporated herein by reference in their entirety.

FIELD

The present disclosure relates to a data recording device and a control method for the data recording device.

BACKGROUND

A data recording device including a volatile memory and a non-volatile memory has been known (for example, Patent Literature (PTL) 1). This type of data recording device temporarily writes data into the volatile memory characterized by a fast processing speed, and then transfers the data from the volatile memory to the non-volatile memory with a writing method that matches the recording properties of the non-volatile memory to reduce the power consumption in the data recording device.

CITATION LIST

Patent Literature

PTL 1: Japanese Unexamined Patent Application Publication No. 2014-26388

SUMMARY

Technical Problem

The present disclosure provides a data recording device and a control method for the data recording device that can avoid data loss.

Solution to Problem

A data recording device according to the present disclosure includes: a first non-volatile memory; a second non-volatile memory characterized by a processing speed faster than a processing speed of the first non-volatile memory; and an access controller that controls writing of data into each of the first non-volatile memory and the second non-volatile memory, based on an indicator related to a temperature of the first non-volatile memory. The access controller (a) writes data into the first non-volatile memory when the indicator satisfies a first condition, and (b) writes data into the second non-volatile memory and transfers the data from the second non-volatile memory to the first non-volatile memory when the indicator satisfies a second condition.

Advantageous Effects

The data recording device and so on according to the present disclosure can avoid data loss.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Underlying Knowledge Forming Basis of the Present Disclosure

The present inventor has found that the technique mentioned in the "Background" section has the following problems.

For example, when the power supply to the conventional data recording device described above is unexpectedly interrupted due to a power outage or the like, data that has not been transferred from the volatile memory to the non-volatile memory will be lost.

As a result of diligent examination of this problem, the present inventor has conceived a data recording device and a control method for the data recording device that can avoid data loss.

Hereafter, embodiments will be described in detail with reference to the drawings as necessary. However, description detailed more than necessary may be omitted. For example, detailed description of well-known matters or repeated description of the substantially same configurations may be omitted. This is to avoid unnecessary redundancy and make the following description easier for those skilled in the art to understand.

It should be noted that the inventor has provided the accompanying drawings and following description in order to facilitate sufficient understanding of the present disclosure by those skilled in the art, and thus are not intended to limit the subject matters of the claims.

Embodiment 1

1-1. Configuration of Data Recording System

Figure 1:
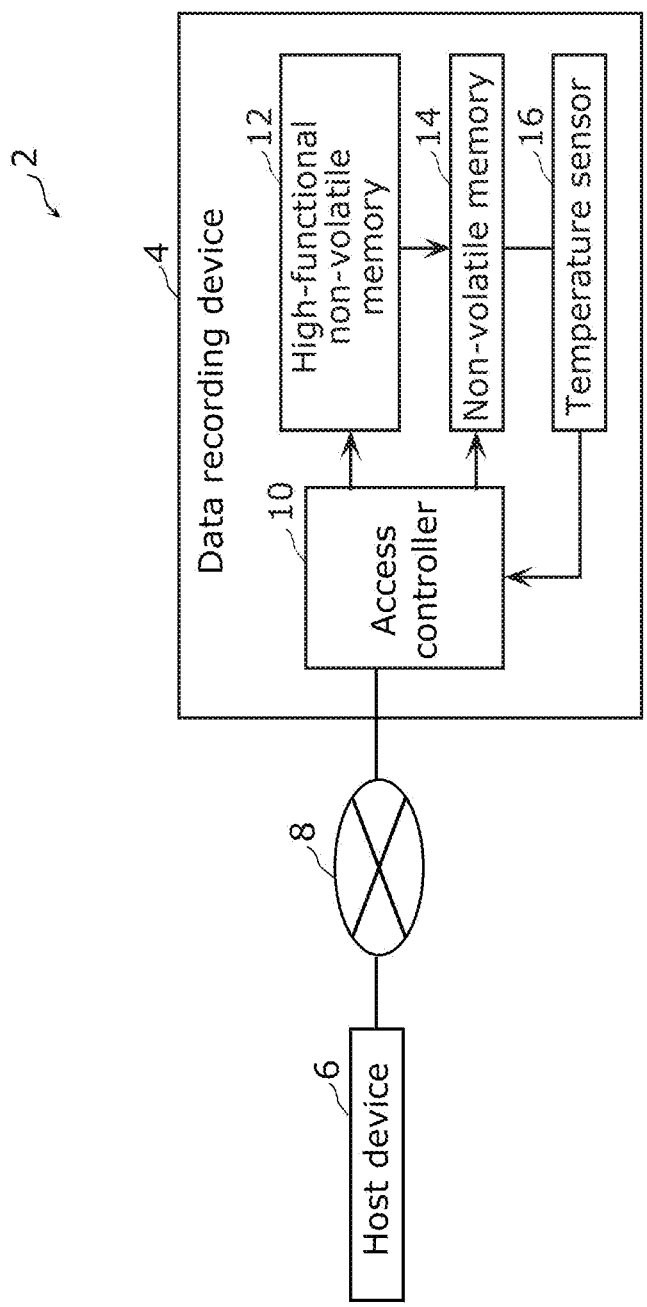
FIG. 1 is a block diagram illustrating a configuration of a data recording system according to Embodiment 1.

First, a configuration of data recording system 2 according to Embodiment 1 will be described with reference to FIG. 1. FIG. 1 is a block diagram illustrating a configuration of data recording system 2 according to Embodiment 1.

As illustrated in FIG. 1, data recording system 2 according to Embodiment 1 includes data recording device 4 and host device 6. These data recording device 4 and host device 6 are communicably connected to each other via network 8. Network 8 is built using Ethernet (registered trademark), for example.

Data recording device 4 is a storage unit for recording various types of data. Data recording device 4 includes: access controller 10, high-functional non-volatile memory 12 (an example of a second non-volatile memory), non-volatile memory 14 (an example of a first non-volatile memory), and temperature sensor 16.

Note that data recording device 4 includes: a memory that records a software program, such as a read only memory (ROM) or a random access memory (RAM); a central processing unit (CPU) that reads and executes the software program recorded on the memory; a communication interface for communicating with host device 6 via network 8; and storage for recording various types of data. Access controller 10 is implemented by the CPU reading and executing the software program recorded on the memory.

Moreover, data recording device 4 is accessed through network 8 from host device 6 using a protocol of the storage included in data recording device 4. An example of such a protocol is Non-Volatile Memory express-over Fabrics (NVMe-oF). Moreover, the inside of data recording device 4 is accessed using a protocol of the storage included in data recording device 4. An example of such a protocol is NVMe.

Access controller 10 is a communication interface that receives data from host device 6. Moreover, when access controller 10 receives data from host device 6, access controller 10 controls writing of the data into high-functional non-volatile memory 12 and non-volatile memory 14 based on a temperature detected by temperature sensor 16. Specifically, access controller 10 selects one of high-functional non-volatile memory 12 or non-volatile memory 14 as a destination to which the data from host device 6 is to be written, based on the temperature detected by temperature sensor 16.

High-functional non-volatile memory 12 is a non-volatile memory characterized by a processing speed faster than the processing speed of non-volatile memory 14. High-functional non-volatile memory 12 is storage that includes, for example, Intel Optane Solid State Drive (SSD) (registered trademark). Data is written into and erased from high-functional non-volatile memory 12 in units of bytes. Note that high-functional non-volatile memory 12 generates more heat (power consumption is greater) than a dynamic random access memory (DRAM) (volatile memory 108 illustrated in FIG. 3, which will be described later) does, which is used as a buffer memory in conventional techniques. Moreover, high-functional non-volatile memory 12 is used as a buffer memory for recording data temporarily, and all data written into high-functional non-volatile memory 12 is eventually transferred to non-volatile memory 14.

Non-volatile memory 14 is, for example, storage that includes SSD including a NAND flash memory or the like. Data is written into non-volatile memory 14 in units of pages and erased from non-volatile memory 14 in units of blocks, each block including a plurality of pages. Note that the storage capacity of non-volatile memory 14 is larger than the storage capacity of high-functional non-volatile memory 12.

Temperature sensor 16 detects a temperature of non-volatile memory 14 (an example of an indicator related to the temperature of non-volatile memory 14) and outputs the detected result to access controller 10.

Host device 6 is a device for processing data. An example of host device 6 is a video editing device that processes video data. Host device 6 can write data into storage (high-functional non-volatile memory 12 or non-volatile memory 14) included in data recording device 4 by accessing data recording device 4 via network 8.

1-2. Operation of Data Recording Device

Figure 2A:
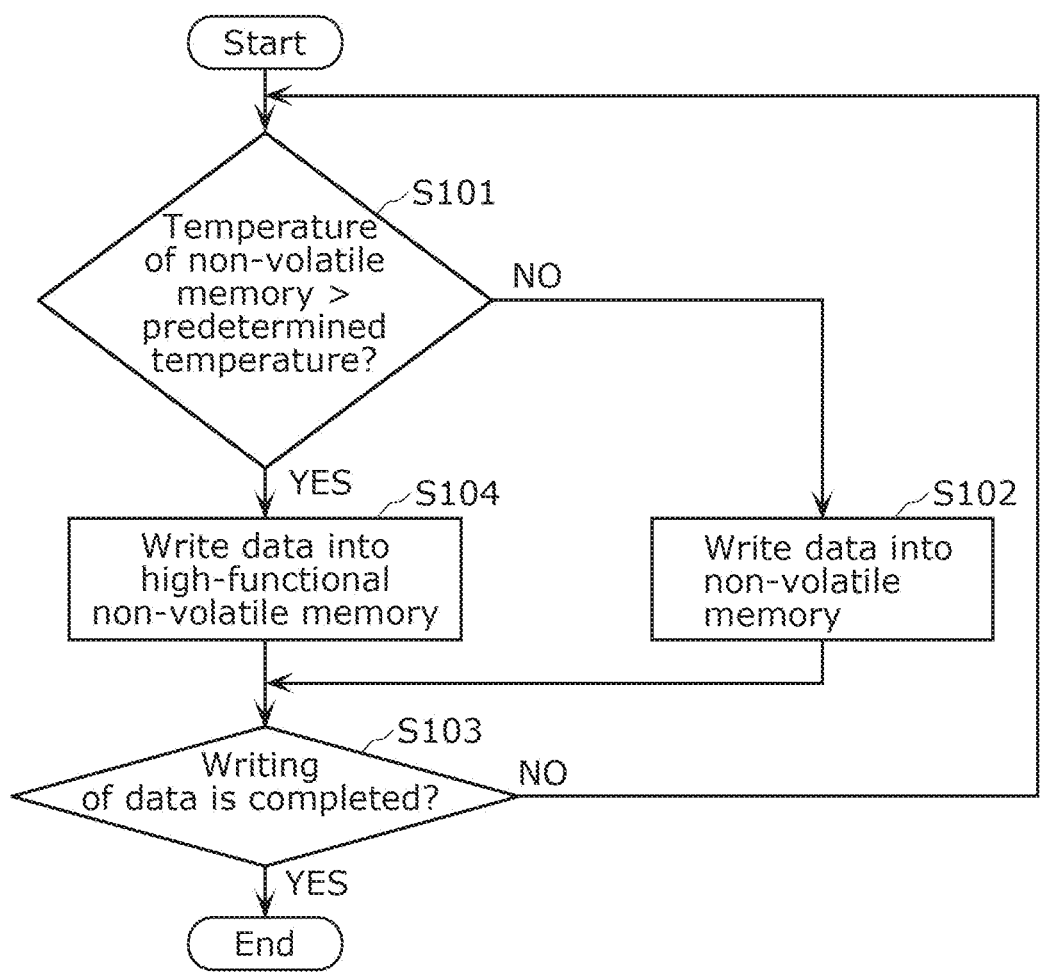
FIG. 2A is a flowchart illustrating a data writing process performed by a data recording device according to Embodiment 1.

Next, a data writing process performed by data recording device 4 according to Embodiment 1 will be described with reference to FIG. 2A. FIG. 2A is a flowchart illustrating a data writing process performed by data recording device 4 according to Embodiment 1.

Hereafter, a case where host device 6 accesses data recording device 4 via network 8 and instructs data recording device 4 to write data will be described. Specifically, host device 6 transmits data to data recording device 4 together with a recording command via network 8. The recording command is a command signal for instructing data recording device 4 to write data into data recording device 4. The recording command includes, for example, information indicating the size of data.

When access controller 10 receives data from host device 6, access controller 10 obtains a temperature detected by temperature sensor 16. As illustrated in FIG. 2A, access controller 10 determines whether the temperature of non-volatile memory 14 is higher than a predetermined temperature (for example, 75 degrees Celsius) (an example of a first temperature and a second temperature), based on the temperature detected by temperature sensor 16 (S101).

When the temperature of non-volatile memory 14 is lower than or equal to the predetermined temperature (i.e., when the indicator satisfies a first condition) (NO in S101), access controller 10 writes data from host device 6 into non-volatile memory 14 (S102). Here, access controller 10 writes data directly into non-volatile memory 14, not via high-functional non-volatile memory 12. Moreover, access controller 10 writes data with a size specified by the recording command without taking into account the blocks of non-volatile memory 14. Furthermore, the temperature rise in non-volatile memory 14 increases in proportion to the size of the data written. In other words, generation of heat in non-volatile memory 14 decreases as the size of data written into non-volatile memory 14 per unit time decreases.

When writing of all data instructed by host device 6 is completed (YES in S103), the process ends. In contrast, when writing of all data instructed by host device 6 is not completed (NO in S103), the process returns to step S101 described above. In this case, by repeating writing of data into non-volatile memory 14, the temperature of non-volatile memory 14 increases. Writing of data into non-volatile memory 14 (S102) is repeatedly performed until the temperature of non-volatile memory 14 increases to the predetermined temperature.

In step S101, when the temperature of non-volatile memory 14 is higher than the predetermined temperature (i.e., when the indicator satisfies a second condition) (YES in S101), access controller 10 writes data from host device 6 into high-functional non-volatile memory 12 (S104). Note that the recording speed of data in non-volatile memory 14 decreases as the temperature of non-volatile memory 14 increases to a higher temperature exceeding the predetermined temperature, due to the properties of non-volatile memory 14. More specifically, since non-volatile memory 14 may be damaged when the temperature of non-volatile memory 14 increases to a high temperature, control is performed to reduce the amount of data to be written (amount of heat generation) per unit time by, for example, decreasing an operation clock so that the temperature of non-volatile memory 14 does not reach a temperature higher than or equal to a certain temperature. This delays the notification of the completion of writing to host device 6, resulting in a decreased recording speed from the perspective of host device 6. Therefore, when the temperature of non-volatile memory 14 is higher than the predetermined temperature, access controller 10 switches the destination to which data is to be written, from non-volatile memory 14 to high-functional non-volatile memory 12 to inhibit further temperature rise in non-volatile memory 14.

After step S104, when writing of all data instructed by host device 6 is completed (YES in S103), the process ends. In contrast, when writing of all data instructed by host device 6 is not completed (NO in S103), the process returns to step S101. In this case, writing of data into high-functional non-volatile memory 12 (S104) is repeatedly performed until the temperature of non-volatile memory 14 decreases to the predetermined temperature. Since data is not directly written into non-volatile memory 14 during that time, the temperature of non-volatile memory 14 gradually decreases.

Figure 2B:
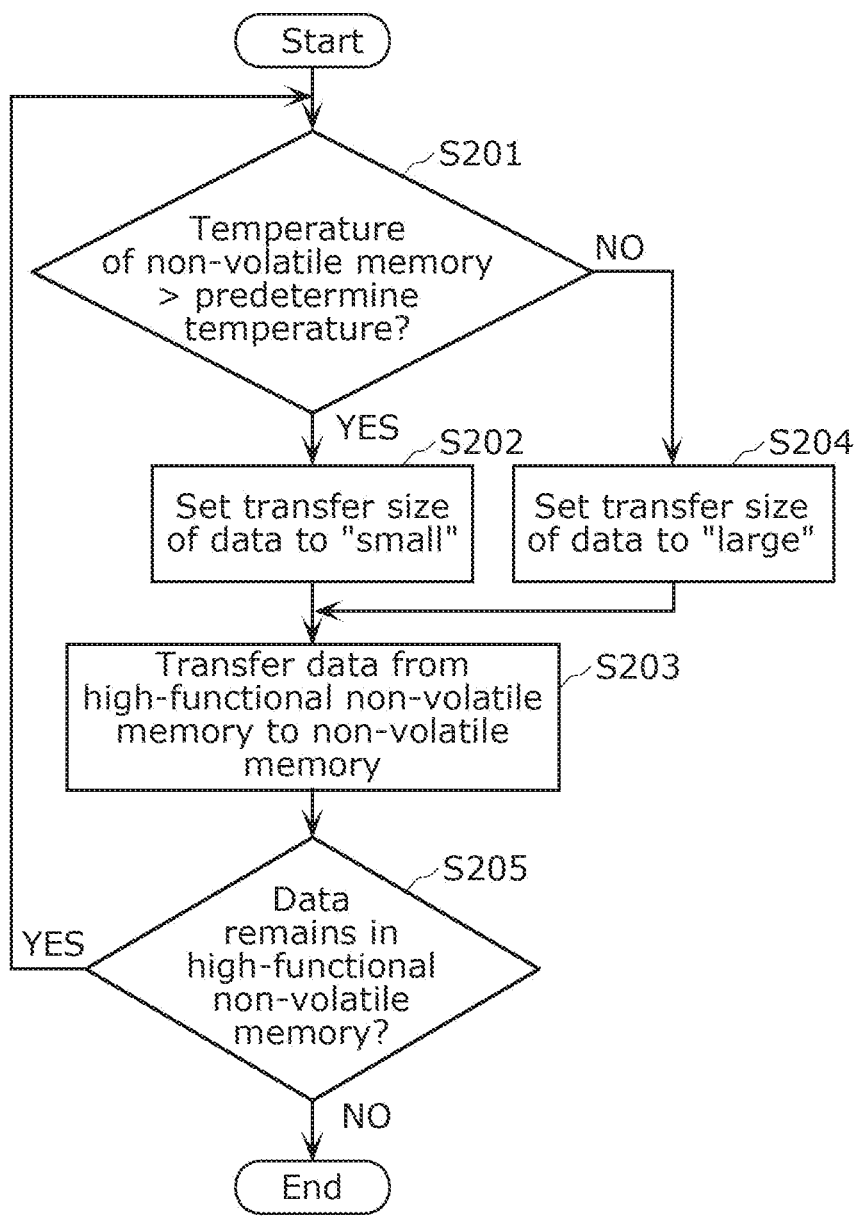
FIG. 2B is a flowchart illustrating a data transfer process performed by the data recording device according to Embodiment 1.

Next, a data transfer process performed by data recording device 4 according to Embodiment 1 will be described with reference to FIG. 2B. FIG. 2B is a flowchart illustrating a data transfer process performed by data recording device 4 according to Embodiment 1.

As illustrated in FIG. 2B, access controller 10 determines, in a state in which the data from host device 6 is written into high-functional non-volatile memory 12, whether the temperature of non-volatile memory 14 is higher than a predetermined temperature (for example, 70 degrees Celsius), based on the temperature detected by temperature sensor 16 (S201).

When the temperature of non-volatile memory 14 is higher than the predetermined temperature due to the temperature of non-volatile memory 14 not having decreased sufficiently (YES in S201), access controller 10 sets a transfer size of data per transfer from high-functional non-volatile memory 12 to non-volatile memory 14, to "small" (an example of a second size) (S202). Access controller 10 transfers data from high-functional non-volatile memory 12 to non-volatile memory 14, with the "small" transfer size that has been set (S203). As described above, when the temperature of non-volatile memory 14 is higher than the predetermined temperature, further temperature rise in non-volatile memory 14 due to data transfer can be inhibited by setting the transfer size of data to "small".

In contrast, in step S201, when the temperature of non-volatile memory 14 is lower than or equal to the predetermined temperature due to the temperature of non-volatile memory 14 having decreased sufficiently (NO in S201), access controller 10 sets a transfer size of data per transfer from high-functional non-volatile memory 12 to non-volatile memory 14, to "large" (an example of a first size) (S204). This "large" transfer size is larger than the "small" transfer size that has been set in step S202. Access controller 10 transfers data from high-functional non-volatile memory 12 to non-volatile memory 14, with the "large" transfer size that has been set (S203). As described above, when the temperature of non-volatile memory 14 is lower than or equal to the predetermined temperature, setting the transfer size of data to "large" makes it possible to transfer data in a short time while maintaining the recording speed of data in non-volatile memory 114.

Note that each of the "large" transfer size and the "small" transfer size described above is an integral multiple of the block size of non-volatile memory 14. In step S203, data is transferred in units of blocks of non-volatile memory 14.

Moreover, the temperature rise in non-volatile memory 14 can be inhibited in a greater degree when data is written into non-volatile memory 14 via high-functional non-volatile memory 12, compared with when the data is directly written into non-volatile memory 14. This is because when data is written into non-volatile memory 14 via high-functional non-volatile memory 12, the data is written into non-volatile memory 14 in units of blocks each having an optimal size, and thus garbage collection can be inhibited and the number of write cycles to non-volatile memory 14 can be reduced.

When data remains in high-functional non-volatile memory 12, that is, when not all data written into high-functional non-volatile memory 12 is transferred to non-volatile memory 14 (YES in S205), the process returns to step S201 described above. In this case, the processes from steps S201 to S205 described above are repeatedly performed until all data written into high-functional non-volatile memory 12 is transferred to non-volatile memory 14.

In contrast, when no data remains in high-functional non-volatile memory 12, that is, when all data written into high-functional non-volatile memory 12 is transferred to non-volatile memory 14 (NO in S205), the process ends.

1-3. Advantageous Effects

Figure 3:
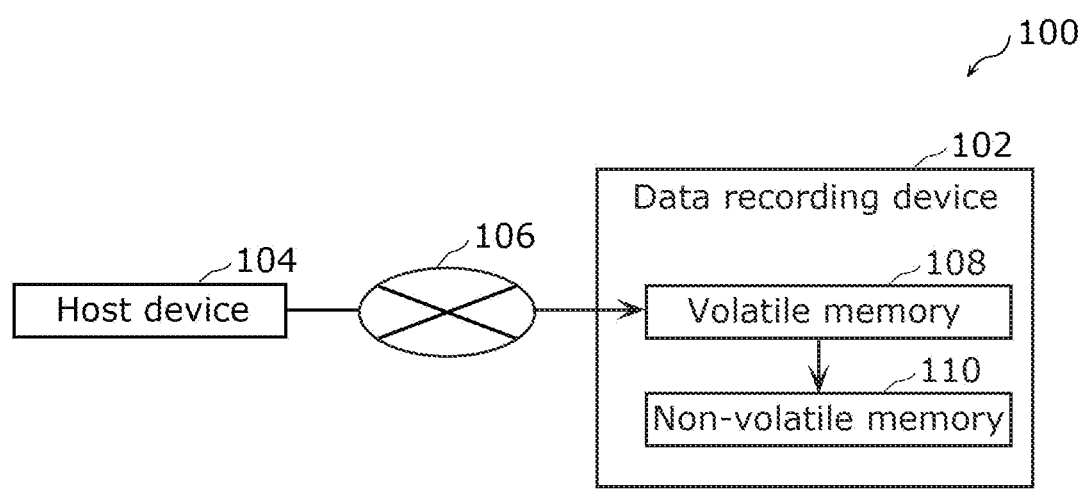
FIG. 3 is a block diagram illustrating a configuration of a data recording system according to a comparative example.

FIG. 3 is a block diagram illustrating a configuration of data recording system 100 according to a comparative example. As illustrated in FIG. 3, data recording system 100 according to the comparative example includes data recording device 102 and host device 104. These data recording device 102 and host device 104 are communicably connected to each other via network 106.

Data recording device 102 includes volatile memory 108 and non-volatile memory 110. Volatile memory 108 is, for example, a DRAM, and non-volatile memory 110 is, for example, a NAND flash memory.

Data recording device 102 temporarily writes data into volatile memory 108 characterized by a fast processing speed, and then transfers the data from volatile memory 108 to non-volatile memory 110 with a writing method that matches the recording properties of non-volatile memory 110 to reduce the power consumption in data recording device 102.

However, for example, when the power supply to data recording device 102 is unexpectedly interrupted due to a power outage or the like, the data remaining in volatile memory 108 that has not been transferred from volatile memory 108 to non-volatile memory 110 will be lost.

To address this, in the present embodiment, data recording device 4 includes: non-volatile memory 14; high-functional non-volatile memory 12 characterized by a processing speed faster than a processing speed of non-volatile memory 14; and access controller 10 that controls writing of data into each of non-volatile memory 14 and high-functional non-volatile memory 12, based on an indicator related to a temperature of non-volatile memory 14. Access controller 10 (a) writes data into non-volatile memory 14 when the indicator satisfies a first condition, and (b) writes data into high-functional non-volatile memory 12 and transfers the data from high-functional non-volatile memory 12 to non-volatile memory 14 when the indicator satisfies a second condition.

With this, access controller 10 selects one of high-functional non-volatile memory 12 or non-volatile memory 14 as a destination to which data is to be written, based on the indicator related to the temperature of non-volatile memory 14. As a result, since data is written into one of high-functional non-volatile memory 12 or non-volatile memory 14, data loss can be avoided even when the power supply to data recording device 4 is unexpectedly interrupted due to a power outage or the like.

Moreover, in the present embodiment, data recording device 4 further includes temperature sensor 16 that detects, as the indicator, the temperature of non-volatile memory 14. The first condition is that the temperature detected by temperature sensor 16 is lower than or equal to a first temperature. The second condition is that the temperature detected by temperature sensor 16 is higher than a second temperature. The second temperature is higher than or equal to the first temperature.

When the temperature of non-volatile memory 14 exceeds the second temperature, data is written into non-volatile memory 14 via high-functional non-volatile memory 12. In this case, consequently, data is written into both high-functional non-volatile memory 12 and non-volatile memory 14, and thus the overall power consumption (overall heat generation) of high-functional non-volatile memory 12 and non-volatile memory 14 increases. However, in this case, since data is written into non-volatile memory 14 in units of blocks, garbage collection can be inhibited and heat generation of non-volatile memory 14 alone can be inhibited. In contrast, when the temperature of non-volatile memory 14 is lower than or equal to the first temperature, data is directly written into non-volatile memory 14. In this case, since the data is not written via high-functional non-volatile memory 12, high-functional non-volatile memory 12 does not consume power. However, data is not always written into non-volatile memory 14 in units of blocks, and thus garbage collection is more likely to occur and non-volatile memory 14 generates greater heat, compared with the above-described case. Therefore, the destination to which data is to be written is switched between high-functional non-volatile memory 12 and non-volatile memory 14 according to the temperature of non-volatile memory 14. With this, when data is directly written into non-volatile memory 14, the overall power consumption of high-functional non-volatile memory 12 and non-volatile memory 14 can be reduced, and when data is written into non-volatile memory 14 via high-functional non-volatile memory 12, heat generation of non-volatile memory 14 can be inhibited. Note that the first temperature and the second temperature may be the same temperature or mutually different temperatures.

Moreover, in the present embodiment, when access controller 10 writes data into high-functional non-volatile memory 12, access controller 10 (c) sets a transfer size of data per transfer from high-functional non-volatile memory 12 to non-volatile memory 14 to a first size, when the temperature detected by temperature sensor 16 is lower than or equal to the first temperature, and (d) sets the transfer size of data per transfer from high-functional non-volatile memory 12 to non-volatile memory 14 to a second size that is smaller than the first size, when the temperature detected by temperature sensor 16 is higher than the second temperature.

With this, when the temperature of non-volatile memory 14 is decreased sufficiently after data is written into high-functional non-volatile memory 12, the data is transferred from high-functional non-volatile memory 12 to non-volatile memory 14 with the first size. This makes it possible to transfer data in a short time while maintaining the recording speed of data into non-volatile memory 14. On the other hand, when the temperature of non-volatile memory 14 is not decreased sufficiently after data is written into high-functional non-volatile memory 12, the data is transferred from high-functional non-volatile memory 12 to non-volatile memory 14 with the second size (<the first size). This makes it possible to inhibit temperature rise in non-volatile memory 14 due to data transfer.

Moreover, in the present embodiment, a control method for data recording device 4 is a control method for data recording device 4 including non-volatile memory 14 and high-functional non-volatile memory 12 characterized by a processing speed faster than a processing speed of non-volatile memory 14. The control method for data recording device 4 includes: writing data into non-volatile memory 14 when an indicator related to a temperature of the first non-volatile memory satisfies a first condition; and writing data into high-functional non-volatile memory 12 and transferring the data from high-functional non-volatile memory 12 to non-volatile memory 14 when the indicator satisfies a second condition.

With this, as with the above-described device, for example, even when the power supply to data recording device 4 is unexpectedly interrupted, data loss can be avoided.

1-4. Variation

Figure 4:
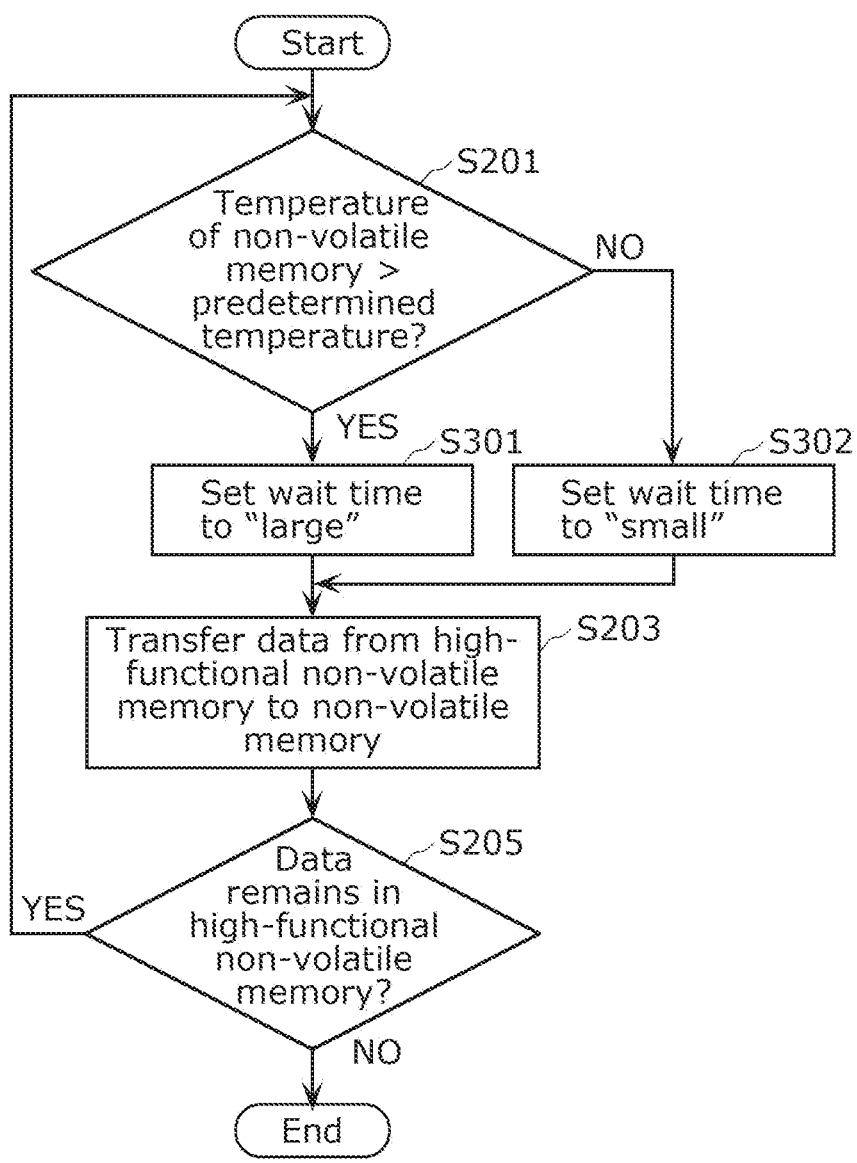
FIG. 4 is a flowchart illustrating a data transfer process performed by a data recording device according to a variation of Embodiment 1.

A data transfer process performed by data recording device 4 according to a variation of Embodiment 1 will be described with reference to FIG. 4. FIG. 4 is a flowchart illustrating a data transfer process performed by data recording device 4 according to a variation of Embodiment 1. Note that in the flowchart in FIG. 4, the same step numbers are assigned to the same processes as the processes in the flowchart in FIG. 2B, and description thereof is omitted.

As illustrated in FIG. 4, access controller 10 determines whether the temperature of non-volatile memory 14 is higher than a predetermined temperature (for example, 70 degrees Celsius), based on the temperature detected by temperature sensor 16 (S201).

When the temperature of non-volatile memory 14 is higher than the predetermined temperature due to the temperature of non-volatile memory 14 not having decreased sufficiently (YES in S201), access controller 10 sets a time interval (hereafter referred to as "wait time") (an example of a second time) for transferring data from high-functional non-volatile memory 12 to non-volatile memory 14 to "large" (S301).

Access controller 10 transfers data from high-functional non-volatile memory 12 to non-volatile memory 14, with the "large" wait time that has been set (S203). In other words, access controller 10 repeats the process of transferring data from high-functional non-volatile memory 12 to non-volatile memory 14 and then transferring different data from high-functional non-volatile memory 12 to non-volatile memory 14 after a relatively long wait time. Note that the transfer size of data per transfer from high-functional non-volatile memory 12 to non-volatile memory 14 is constant. As described above, when the temperature of non-volatile memory 14 is higher than the predetermined temperature, the wait time is set to "large". This makes it possible to inhibit temperature rise in non-volatile memory 14 due to data transfer.

In contrast, in step S201, when the temperature of non-volatile memory 14 is lower than or equal to the predetermined temperature due to the temperature of non-volatile memory 14 having decreased sufficiently (NO in S201), access controller 10 sets the wait time to "small" (an example of a first time) (S302). This "small" wait time is a wait time shorter than the "large" wait time set in step S201.

Access controller 10 transfers data from high-functional non-volatile memory 12 to non-volatile memory 14, with the "small" wait time that has been set (S203). In other words, access controller 10 repeats a process of transferring data from high-functional non-volatile memory 12 to non-volatile memory 14 and then transferring different data from high-functional non-volatile memory 12 to non-volatile memory 14 after a relatively short wait time. Note that the size of data to be transferred per transfer from high-functional non-volatile memory 12 to non-volatile memory 14 is constant. As described above, when the temperature of non-volatile memory 14 is lower than or equal to the predetermined temperature, the wait time is set to "small". With this, data can be transferred in a short time while maintaining the recording speed of data into non-volatile memory 14.

As described above, in the present variation, when access controller 10 writes data into high-functional non-volatile memory 12, access controller 10 (e) sets a time interval for transferring data from high-functional non-volatile memory 12 to non-volatile memory 14 to a first time, when the temperature detected by temperature sensor 16 is lower than or equal to the first temperature, and (f) sets the time interval for transferring data from high-functional non-volatile memory 12 to non-volatile memory 14 to a second time that is longer than the first time, when the temperature detected by temperature sensor 16 is higher than the second temperature.

With this, when the temperature of non-volatile memory 14 is decreased sufficiently after data is written into high-functional non-volatile memory 12, the wait time is set to the first time. This makes it possible to transfer data in a short time while maintaining the data recording speed in non-volatile memory 14. On the other hand, when the temperature of non-volatile memory 14 has not sufficiently decreased after data is written into high-functional non-volatile memory 12, the wait time is set to the second time (>the first time). This makes it possible to inhibit temperature rise in non-volatile memory 14 due to data transfer.

Embodiment 2

2-1. Configuration of Data Recording System

Figure 5:
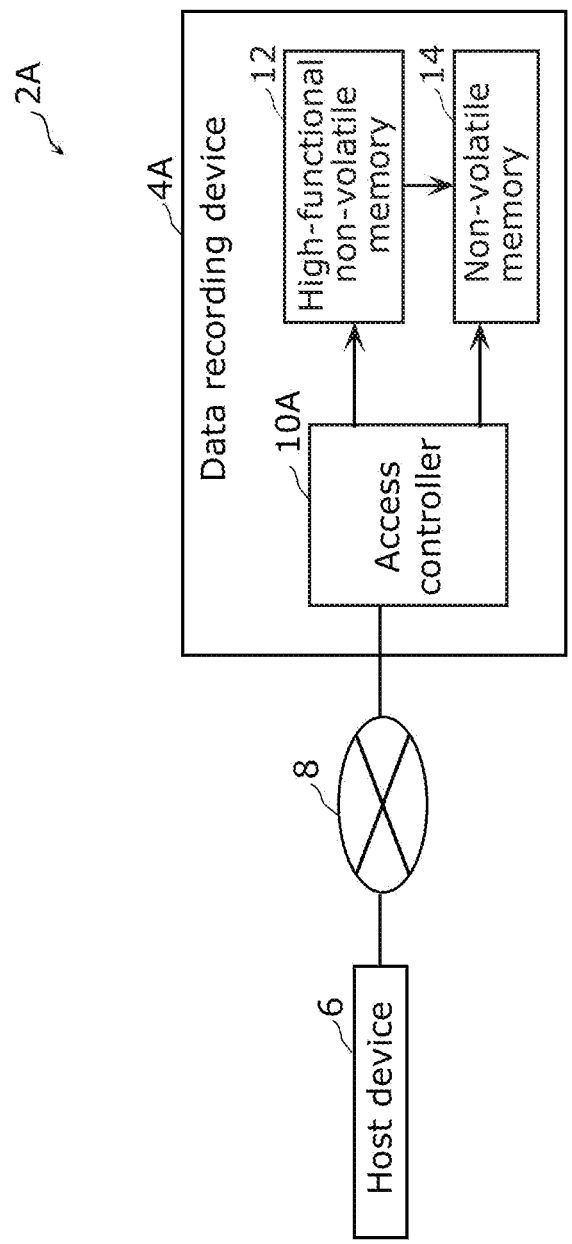
FIG. 5 is a block diagram illustrating a configuration of a data recording system according to Embodiment 2.

A configuration of data recording system 2A according to Embodiment 2 will be described with reference to FIG. 5. FIG. 5 is a block diagram illustrating a configuration of data recording system 2A according to Embodiment 2. Note that in the present embodiment, the same reference signs are assigned to substantially the same structural elements in Embodiment 1 described above, and descriptions thereof are omitted.

As illustrated in FIG. 5, in data recording system 2A according to Embodiment 2, the process performed by access controller 10A of data recording system 4A is different from the process in Embodiment 1 described above. Specifically, when access controller 10A receives data from host device 6, access controller 10A obtains (calculates) a write amplification factor (WAF) (an example of an indicator related to the temperature of non-volatile memory 14) and selects one of high-functional non-volatile memory 12 or non-volatile memory 14 as a destination to which the data from host device 6 is to be written, based on the obtained WAF.

Note that, WAF is a ratio of a data size to be written that is instructed by host device 6 to a data size that has been written into non-volatile memory 14. WAF=(data size that has been written into non-volatile memory 14)/(data size to be written that is instructed by host device 6). When garbage collection or the like occurs due to writing of data into non-volatile memory 14, the amount of data to be written into non-volatile memory 14 increases and the WAF becomes larger than "1". Usually, WAF is a value larger than "1" and the state of the WAF becomes better as WAF becomes smaller (closer to "1").

Note that when data is directly written into non-volatile memory 14, the state of the WAF becomes worse. In contrast, when data is written into non-volatile memory 14 via high-functional non-volatile memory 12, data is written into non-volatile memory 14 in units of blocks and thus the state of the WAF becomes better. In the present embodiment, the destination to which data from host device 6 is to be written is switched between high-functional non-volatile memory 12 and non-volatile memory 14 based on the WAF, but consequently, the temperature of non-volatile memory 14 is to be controlled. Therefore, the WAF can be used as an indicator related to the temperature of non-volatile memory 14.

2-2. Operation of Data Recording Device

Figure 6:
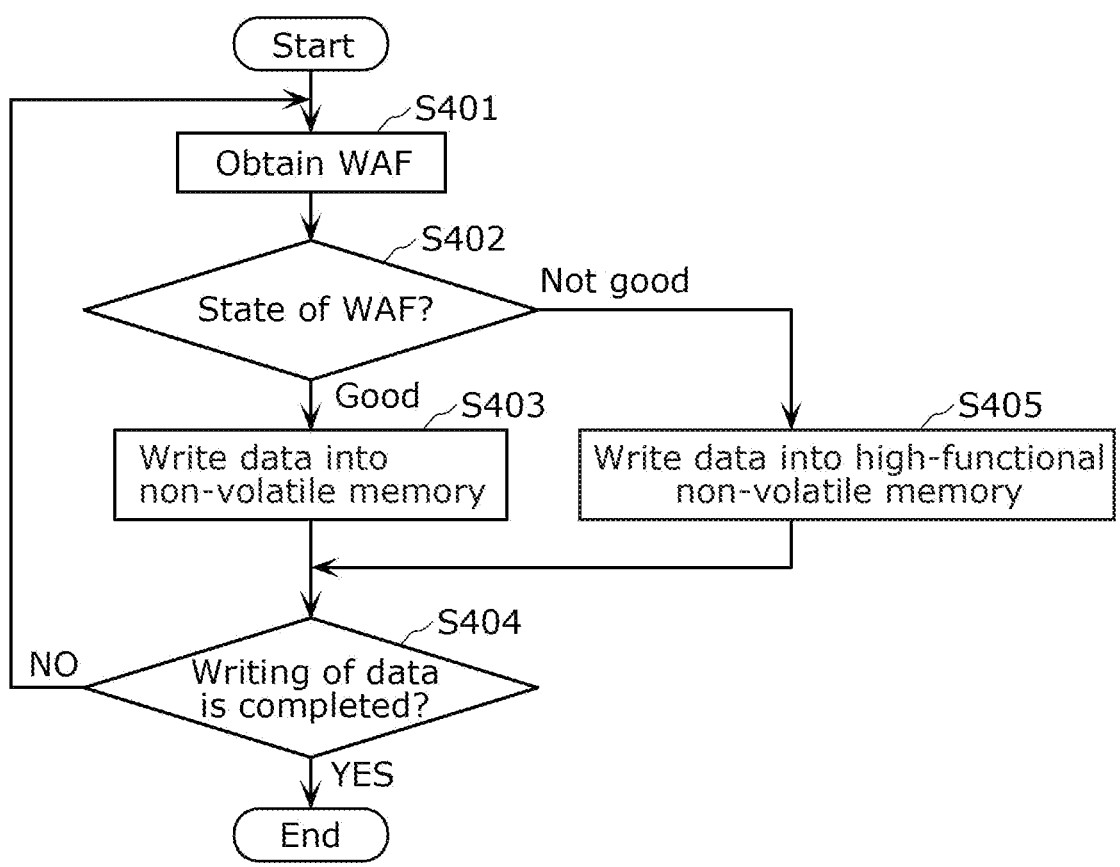
FIG. 6 is a flowchart illustrating operation of a data recording device according to Embodiment 2.

Next, operation of data recording device 4A according to Embodiment 2 will be described with reference to FIG. 6. FIG. 6 is a flowchart illustrating operation of data recording device 4A according to Embodiment 2.

Hereafter, a case where host device 6 accesses data recording device 4A via network 8 and instructs data recording device 4A to write data will be described.

As illustrated in FIG. 6, when access controller 10A receives data from host device 6, access controller 10A obtains a WAF (S401). Access controller 10A determines the state of the WAF by comparing the obtained WAF and a predetermined value (for example, 1.2) (S402). Here, when the WAF is less than or equal to the predetermined value (for example, WAF 1.2), access controller 10A determines that the state of the WAF is good. On the other hand, when the WAF is greater than the predetermined value (for example, WAF>1.2), access controller 10A determines that the state of the WAF is not good.

When the state of the WAF is good (i.e., when the indicator satisfies the first condition) ("Good" in S402), access controller 10A writes data from host device 6 into non-volatile memory 14 (S403). Here, access controller 10A writes data directly into non-volatile memory 14, not via high-functional non-volatile memory 12. When the state of the WAF is good, heat generation in non-volatile memory 14 is considered to be small. Therefore, even when the temperature of non-volatile memory 14 increases by writing data directly into non-volatile memory 14, there is some time to spare before the temperature of non-volatile memory 14 reaches a high temperature.

After step S403, when writing of all data instructed by host device 6 is completed (YES in S404), the process ends. In contrast, when writing of all data instructed by host device 6 is not completed (NO in S404), the process returns to step S401.

In contrast, in step S402, when the state of the WAF is not good (i.e., when the indicator satisfies the second condition) ("Not good" in S402), access controller 10A writes data from host device 6 into high-functional non-volatile memory 12 (S405). When the state of the WAF is not good, the power consumption of non-volatile memory 14 is considered to be relatively high and heat generation in non-volatile memory 14 is considered to be large. Therefore, by writing data into high-functional non-volatile memory 12, temperature rise of non-volatile memory 14 can be inhibited.

After step S405, when writing of all data instructed by host device 6 is completed (YES in S404), the process ends. In contrast, when writing of all data instructed by host device 6 is not completed (NO in S404), the process returns to step S401.

Note that also in the present embodiment, data recording device 4A performs the data transfer process, as with Embodiment 1 described above. The data transfer process according to the present embodiment is performed in accordance with the data transfer process illustrated in the flowcharts in FIG. 2B and FIG. 4, except that determining the temperature of non-volatile memory 14 in step S201 in FIG. 2B and FIG. 4 is replaced with determining whether the WAF is good (in other words, "when the temperature of non-volatile memory 14 is lower than or equal to the predetermined temperature" is replaced with "when the state of the WAF is good", and "when the temperature of non-volatile memory 14 is higher than the predetermined temperature" is replaced with "when the state of the WAF is not good"). Specifically, for example, a transfer size of data per transfer or a time interval for transferring data is set based on the value of the WAF, and data is transferred with the transfer size per transfer or at the time interval that has been set. These processes are repeatedly performed until all data written into high-functional non-volatile memory 12 is transferred to non-volatile memory 14.

2-3. Advantageous Effects

In the present embodiment, access controller 10A obtains, as the indicator, a ratio of a data size to be written that is instructed by host device 6 to a data size that has been written into non-volatile memory 14. The first condition is that the ratio is less than or equal to a predetermined value. The second condition is that the ratio is greater than the predetermined value.

With this, when the state of the WAF is good (the ratio is less than or equal to the predetermined value), heat generation in non-volatile memory 14 is considered to be small. Therefore, even when the temperature of non-volatile memory 14 increases by writing data directly into non-volatile memory 14, there is some time to spare before the temperature of non-volatile memory 14 reaches a high temperature. On the other hand, when the state of the WAF is not good (the ratio is greater than the predetermined value), the power consumption of non-volatile memory 14 is considered to be relatively high and heat generation in non-volatile memory 14 is considered to be large. Therefore, writing data into high-functional non-volatile memory 12 can inhibit temperature rise in non-volatile memory 14.

Other Variations, Etc

Each of the foregoing embodiments has been described as an example of the technique disclosed in the present application. However, the technique in the present disclosure is not limited to the embodiments and is also applicable to embodiments including changes, replacements, additions, omissions, and other modifications as appropriate. Moreover, the structural elements described in each of the embodiments can be combined to create a new embodiment. Therefore, other embodiments will be described below as examples.

Although data recording system 2 (2A) includes a single host device 6 in each of the embodiments described above, the present disclosure is not limited to this example. Data recording system 2 (2A) may include two or more host devices 6.

Moreover, although non-volatile memory 14 is an SSD in each of the embodiments described above, the present disclosure is not limited to this example. Non-volatile memory 14 may be removable storage, such as a memory card attachable to or removable from an adapter.

Note that, in the above embodiments, each of the structural elements may include dedicated hardware, or may be implemented by executing a software program appropriate to each structural element. Each structural element may be implemented as a result of a program executer, such as a CPU or processor, reading and executing a software program stored on a recording medium, such as a hard disk drive or a semiconductor memory.

Moreover, at least one or all the functions of data recording device 4 (4A) according to each embodiment described above may be implemented by executing a program by a processor, such as a CPU.

As described above, the embodiments have been described above as examples of the technique in the present disclosure. For this purpose, accompanying drawings and detailed description have been provided.

The structural elements described in the accompanying drawings and the detailed description may therefore include not only essential structural elements to achieve the object but also structural elements that are not essential to achieve the object and are provided to illustrate the technique described above. Therefore, the description of the non-essential structural elements in the accompanying drawings and the detailed description should not instantly lead to conclusion that the non-essential structural elements are essential.

The foregoing embodiments are intended to be illustrative of the technique in the present disclosure. Therefore, various changes, replacements, additions, omissions, etc. can be made within the scope of the appended claims and their equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, a data recording device including two non-volatile memories.

The invention claimed is:
1. A data recording device comprising:
a first non-volatile memory;
a second non-volatile memory characterized by a processing speed faster than a processing speed of the first non-volatile memory; and
an access controller that controls writing of data into each of the first non-volatile memory and the second non-volatile memory, based on an indicator related to a temperature of the first non-volatile memory, wherein the access controller (a) writes data into the first non-volatile memory when the indicator satisfies a first condition, and (b) writes data into the second non-volatile memory and transfers the data from the second non-volatile memory to the first non-volatile memory when the indicator satisfies a second condition, the data recording device further comprises a temperature sensor that detects, as the indicator, the temperature of the first non-volatile memory, the first condition is that the temperature detected by the temperature sensor is lower than or equal to a first temperature, the second condition is that the temperature detected by the temperature sensor is higher than a second temperature, the second temperature being higher than or equal to the first temperature, and when the access controller writes data into the second non-volatile memory, the access controller (c) sets a transfer size of data per transfer from the second non-volatile memory to the first non-volatile memory to a first size, when the temperature detected by the temperature sensor is lower than or equal to the first temperature, and (d) sets the transfer size of data per transfer from the second non-volatile memory to the first non-volatile memory to a second size that is smaller than the first size, when the temperature detected by the temperature sensor is higher than the second temperature.

2. A data recording device comprising:

a first non-volatile memory;

a second non-volatile memory characterized by a processing speed faster than a processing speed of the first non-volatile memory; and an access controller that controls writing of data into each of the first non-volatile memory and the second non-volatile memory, based on an indicator related to a temperature of the first non-volatile memory, wherein the access controller (a) writes data into the first non-volatile memory when the indicator satisfies a first condition, and (b) writes data into the second non-volatile memory and transfers the data from the second non-volatile memory to the first non-volatile memory when the indicator satisfies a second condition, the data recording device further comprises a temperature sensor that detects, as the indicator, the temperature of the first non-volatile memory, the first condition is that the temperature detected by the temperature sensor is lower than or equal to a first temperature, the second condition is that the temperature detected by the temperature sensor is higher than a second temperature, the second temperature being higher than or equal to the first temperature, and when the access controller writes data into the second non-volatile memory, the access controller (e) sets a time interval for transferring data from the second non-volatile memory to the first non-volatile memory to a first time, when the temperature detected by the temperature sensor is lower than or equal to the first temperature, and (f) sets the time interval for transferring data from the second non-volatile memory to the first non-volatile memory to a second time that is longer than the first time, when the temperature detected by the temperature sensor is higher than the second temperature.

3. A data recording device comprising:

a first non-volatile memory;

a second non-volatile memory characterized by a processing speed faster than a processing speed of the first non-volatile memory; and an access controller that controls writing of data into each of the first non-volatile memory and the second non-volatile memory, based on an indicator related to a temperature of the first non-volatile memory, wherein the access controller (a) writes data into the first non-volatile memory when the indicator satisfies a first condition, and (b) writes data into the second non-volatile memory and transfers the data from the second non-volatile memory to the first non-volatile memory when the indicator satisfies a second condition, the access controller obtains, as the indicator, a ratio of a data size to be written that is instructed by a host device to a data size that has been written into the first non-volatile memory, the first condition is that the ratio is less than or equal to a predetermined value, and the second condition is that the ratio is greater than the predetermined value.

4. A control method for a data recording device including a first non-volatile memory and a second non-volatile memory characterized by a processing speed faster than a processing speed of the first non-volatile memory, the control method comprising:

writing data into the first non-volatile memory when an indicator related to a temperature of the first non-volatile memory satisfies a first condition; and writing data into the second non-volatile memory and transferring the data from the second non-volatile memory to the first non-volatile memory when the indicator satisfies a second condition, wherein the data recording device further includes a temperature sensor that detects, as the indicator, the temperature of the first non-volatile memory, the first condition is that the temperature detected by the temperature sensor is lower than or equal to a first temperature, the second condition is that the temperature detected by the temperature sensor is higher than a second temperature, the second temperature being higher than or equal to the first temperature, and the control method further comprises:

when writing data into the second non-volatile memory, (i) setting a transfer size of data per transfer from the second non-volatile memory to the first non-volatile memory to a first size, when the temperature detected by the temperature sensor is lower than or equal to the first temperature, and (ii) setting the transfer size of data per transfer from the second non-volatile memory to the first non-volatile memory to a second size that is smaller than the first size, when the temperature detected by the temperature sensor is higher than the second temperature.

5. A control method for a data recording device including a first non-volatile memory and a second non-volatile memory characterized by a processing speed faster than a processing speed of the first non-volatile memory, the control method comprising:

writing data into the first non-volatile memory when an indicator related to a temperature of the first non-volatile memory satisfies a first condition; and writing data into the second non-volatile memory and transferring the data from the second non-volatile memory to the first non-volatile memory when the indicator satisfies a second condition, wherein the data recording device further includes a temperature sensor that detects, as the indicator, the temperature of the first non-volatile memory, the first condition is that the temperature detected by the temperature sensor is lower than or equal to a first temperature, the second condition is that the temperature detected by the temperature sensor is higher than a second temperature, the second temperature being higher than or equal to the first temperature, and the control method further comprises:

when writing data into the second non-volatile memory, (i) setting a time interval for transferring data from the second non-volatile memory to the first non-volatile memory to a first time, when the temperature detected by the temperature sensor is lower than or equal to the first temperature, and (ii) setting the time interval for transferring data from the second non-volatile memory to the first non-volatile memory to a second time that is longer than the first time, when the temperature detected by the temperature sensor is higher than the second temperature.

6. A control method for a data recording device including a first non-volatile memory and a second non-volatile memory characterized by a processing speed faster than a processing speed of the first non-volatile memory, the control method comprising:

writing data into the first non-volatile memory when an indicator related to a temperature of the first non-volatile memory satisfies a first condition;

writing data into the second non-volatile memory and transferring the data from the second non-volatile memory to the first non-volatile memory when the indicator satisfies a second condition; and obtaining, as the indicator, a ratio of a data size to be written that is instructed by a host device to a data size that has been written into the first non-volatile memory, wherein the first condition is that the ratio is less than or equal to a predetermined value, and the second condition is that the ratio is greater than the predetermined value.

* * * * *